(12) United States Patent
Gallagher

(10) Patent No.: US 6,941,027 B1
(45) Date of Patent: Sep. 6, 2005

(54) METHOD OF AND SYSTEM FOR AUTOMATICALLY DETERMINING A LEVEL OF LIGHT FALLOFF IN AN IMAGE

(75) Inventor: Andrew C. Gallagher, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 890 days.

(21) Appl. No.: 09/626,882

(22) Filed: Jul. 27, 2000

(51) Int. Cl.[7] .............................................. G06K 9/40
(52) U.S. Cl. ...................... 382/274; 382/108; 382/272; 382/273; 382/206; 382/282; 382/283; 358/463; 702/189; 702/190; 702/191; 702/194; 702/195; 702/199
(58) Field of Search ................................ 382/274, 108, 382/206, 272, 273, 282, 283; 702/185–195, 702/199; 358/463

(56) References Cited

U.S. PATENT DOCUMENTS

| | | | | |
|---|---|---|---|---|
| 5,461,440 A | * | 10/1995 | Toyoda et al. .............. | 396/311 |
| 6,219,446 B1 | * | 4/2001 | Kiriki et al. ................ | 382/167 |
| 6,323,934 B1 | * | 11/2001 | Enomoto ..................... | 355/40 |
| 6,670,988 B1 | * | 12/2003 | Gallagher et al. ........ | 348/224.1 |
| 6,693,673 B1 | * | 2/2004 | Tanaka et al. .............. | 348/371 |
| 2004/0032512 A1 | * | 2/2004 | Silverbrook ............. | 348/222.1 |

OTHER PUBLICATIONS

Miles V. Klein, Optics, Second Edition, John Wiley & Sons, Inc., New York, 1986, pp-193-256.
Jong-Sen Lee, Digital Image Enhancement and Noise Filtering by Use of Local Statistics, IEEE Transactions on Pattern Analysis and Machine Intelligence, vol. PAMI-2, No. 2, Mar. 1980, pp. 165-168.

* cited by examiner

Primary Examiner—Andrew W. Johns
Assistant Examiner—Patrick L. Edwards
(74) Attorney, Agent, or Firm—David M. Woods

(57) ABSTRACT

An image processing system includes an image collector and a light falloff correction system. The light falloff correction system comprises a polar transformer that converts an image into radial traces and a falloff fitter that fits the radial traces to a model of falloff to determine a light falloff correction for the image.

28 Claims, 4 Drawing Sheets

US 6,941,027 B1

METHOD OF AND SYSTEM FOR AUTOMATICALLY DETERMINING A LEVEL OF LIGHT FALLOFF IN AN IMAGE

FIELD OF THE INVENTION

The invention relates generally to the field of digital image processing, and in particular to a method of automatically determining a level of light falloff in an image.

BACKGROUND OF THE INVENTION

As described in many texts on the subject of optics (for example, M. Klein, *Optics*, John Wiley & Sons, Inc., New York, 1986, pp. 193–256, incorporated herein by reference) lenses produce non-uniform exposure at the focal plane when imaging a uniformly illuminated surface. When the lens is modeled as a thin lens, the ratio of the intensity of the light of the image at any point is described as $\cos^4$ of the angle between the optical axis, the lens, and the point in the image plane. This $\cos^4$ falloff does not include such factors as vignetting, which is a property describing the loss of light rays passing through an optical system.

In photographic images, this $\cos^4$ falloff generally causes the corners of an image to be darker than desired. The effect of the falloff is more severe for cameras or capture devices with a short focal length lens. In addition, flash photography will often produce an effect similar to falloff if the subject is centrally located with respect to the image. This effect is referred to as flash falloff.

As described in U.S. Pat. No. 5,461,440 (incorporated herein by reference), it is commonly known that lens falloff may be corrected by applying an additive mask to an image in a log domain or a multiplicative mask to an image in the linear domain. This conventional $\cos^4$ based mask is solely dependent upon a single parameter: the focal length of the imaging system. Also, images with flash falloff in addition to lens falloff may by compensated for by a stronger mask (i.e. a mask generated by using a smaller value for the focal length than one would normally use.)

Toyoda and Yamasaki describe in U.S. Pat. No. 5,461,440 (incorporated herein by reference) a method of recording a camera identification code onto the film upon which an image is captured. This identification code specifies lens information that may be used at the time the image is processed to select an appropriate level of falloff compensation. However, it is not always practical or possible to record such information onto photographic film. Additionally, many scene dependent factors affect the apparent level of light falloff present in a scene, including exposure level (extremely underexposed scenes never appear to contain falloff), flash condition, and scene geometry.

Gallagher and Gindele (in U.S. Pat. No. 6,670,988, issued on Dec. 30, 2003 and incorporated herein by reference) describe a variety of other methods of selecting the parameter used to generate the falloff compensation mask. For example, in this conventional teaching the parameter could be selected in order to simulate the level of falloff compensation that is naturally performed by the lens of the optical printer. Additionally, the parameter could be determined interactively by an operator using a graphical user interface (GUI) or, the parameter could be dependent upon the film format (APS or SUC) or the sensor size. Finally, they teach a simple automatic method of determining the parameter. A selected set of low resolution frames are averaged to generate an analysis frame. A $\cos^4$ surface model is fit to this analysis frame. This value of the parameter f used to fit the $\cos^4$ model to the analysis frame is determined to be the value of the parameter f for generating the falloff compensation mask for the selected set of images. However, with such a system, an image of a person with a white shirt standing in front of a gray wall would be interpreted as a great deal of falloff because the image would have darker edges relative to the image center.

PROBLEMS TO BE SOLVED BY THE INVENTION

There are a number of problems with conventional systems that compensate for light falloff in images. For example, most conventional systems require that the focal length of the device taking the picture must remain with the image to perform falloff correction. In addition, conventional systems cannot compensate for image discontinuities. Instead, with conventional systems, such discontinuities are often interpreted as dramatic light falloff. Compensation for such discontinuities distorts the image in the picture without necessarily correcting for light falloff. Thus, there exists a need to reliably and automatically determine a level of light falloff present in an image so that the falloff may be compensated.

SUMMARY OF THE INVENTION

The present invention operates upon a single image or a collection of images from a common capture device. Each image is processed to derive a measure of the falloff present in the image. First, each image is checked to ensure that the image is not severely underexposed to the point where light falloff would not be detectable or correctable in the image. Next, the image is processed to remove the components of texture and image structure from the image signal. A fitting is performed to determine the best fit between a falloff model and the result of the image processing steps. The results of these fittings are combined to determine an overall level of falloff for a digital image.

More specifically, the invention comprises an image processing system that includes an image collector and a light falloff correction system. The light falloff correction system comprises a polar transformer that converts an image into radial traces and a falloff fitter that fits the radial traces to a model of falloff to determine a light falloff correction for the image.

The system may also include a discontinuity remover that removes discontinuities from the radial traces, wherein the falloff fitter fits the adjusted radial traces to the model of falloff to determine the light falloff correction for the image. The discontinuity remover includes a differentiator that determines an estimate of derivatives of the radial traces, a derivative adjuster that adjusts the derivatives and produces adjusted derivatives that are within minimum and maximum derivative bounds, and an integrator that produces the adjusted radial traces from the adjusted derivatives.

The system may also include an underexposure checker that prevents underexposed images from being processed by the polar transformer, a falloff mask generator that generates a correction mask for the image based on the light falloff correction, a grouper that combines fit values used by the falloff fitter to fit the radial traces to the model, a weighting unit that weights the fit values, or a flash fire detector that determines whether the image was obtained with a flash depending upon the light falloff correction. The polar transformer can produce the radial traces from a group of images and the falloff fitter can then determine a single light falloff correction for the group of images.

The invention also encompasses a method of performing light falloff correction of an image that includes converting an image into radial traces and fitting the radial traces to a model of falloff to determine the light falloff correction for the image.

The method may also include removing discontinuities from the radial traces, wherein the fitting comprises fitting the adjusted radial traces to the model of falloff to determine the light falloff correction for the image. The removing process includes estimating derivatives of the radial traces, adjusting the derivatives to produce adjusted derivatives that are within minimum and maximum derivative bounds, and integrating the adjusted derivatives to produce the adjusted radial traces.

The method may also prevent underexposed images from being converted and generates a correction mask for the image based on the light falloff correction. The method may also combine fit values used by the falloff fitter to fit the radial traces to the model and may weight the fit values. The invention applies the light falloff correction to the image. The invention also detects a flash fire condition of the image based on an amount of the light falloff correction. The invention is also useful for converting a group of images and producing a single light falloff correction for the group of images.

ADVANTAGES OF THE INVENTION

One advantage of the invention lies in the ability to perform light falloff correction without requiring external environmental inputs. In other words, the invention performs falloff correction based solely upon the image (or series of images). Further, the invention provides a unique feature for eliminating discontinuities from the falloff calculation. By eliminating discontinuities, the accuracy of the falloff correction is greatly enhanced.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

Figure 1:
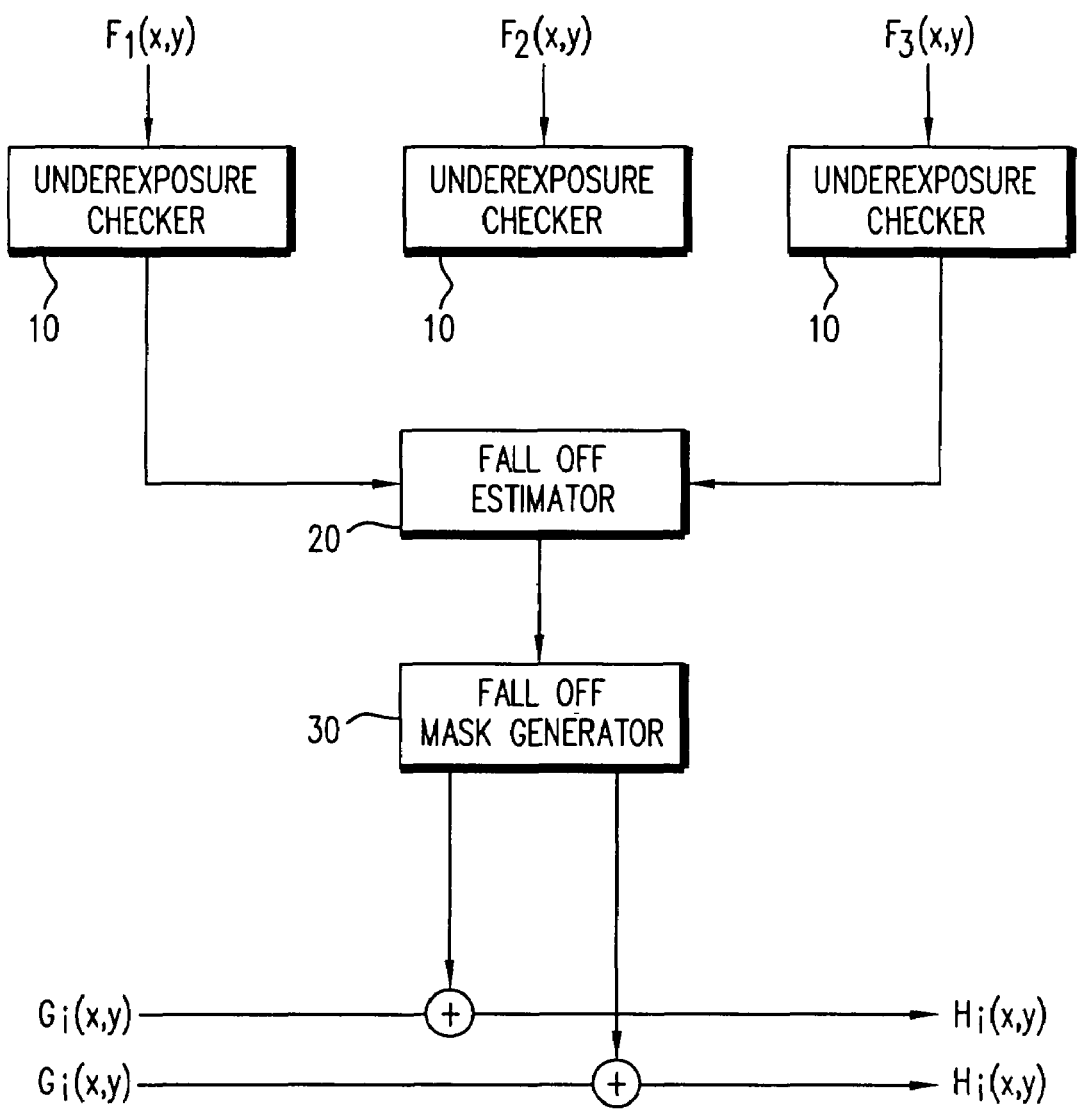
FIG. 1 is a block diagram of the invention.

Referring to FIG. 1, there is illustrated an overview of the present invention. One or more analysis images $F_i(x,y)$ are each input to an underexposure checker 10. The purpose of the underexposure checker 10 is to determine if the exposure of the image is such that performing falloff estimation or compensation on such an image would be inappropriate. The underexposure checker 10 will block images $F(x,y)$ from becoming inputs to the falloff estimator if the images $F(x,y)$ are considered to be "underexposed."

FIG. 1 shows that image $F_2(x,y)$ is deemed "underexposed" and thus does not enter the falloff estimator 20. Images which are not considered to be underexposed by the underexposure checker 10 are input to a falloff estimator 20. The operation of the underexposure checker 10 is described in more detail below. In a preferred embodiment, the metric of the images $F_i(x,y)$ is logarithmic with respect to scene exposure. Those skilled in the art will recognize that although one preferred embodiment is described with image data in a logarithmic metric, modifications can easily be made so that the metric of the images is not logarithmic. For example, the metric of the images may be linear, in which case the light falloff compensation mask will be multiplicative rather than additive as it is for logarithmic data.

Generally, if multiple images are input to the falloff estimator 20, the images are from a common order of images. For example, the order of images may consist of all digitized images originating from the same roll of color negative film. As another example, the multiple images $F_i(x,y)$ may be all images captured with common flash conditions and also originating from the same roll of color negative film.

The collection of images input to the falloff estimator 20 is said to be a class of images. In one preferred embodiment, the class of images input to the falloff estimator 20 consists of a single image.

The function of the falloff estimator 20 is to determine the overall level of light falloff present in the class of images input to the falloff estimator 20. Thus, in a preferred embodiment, the function of the falloff estimator 20 is to determine the overall level of light falloff present in the single image input to the falloff estimator 20 (since the class of input images consists of a single image in the preferred embodiment.)

The falloff estimator 20 operates by extracting radial traces from the class of images input to the falloff estimator 20. As described below, radial traces are processed such that the signal variation attributed to noise and image signal is removed, leaving a residual signal variation that can be attributed to light falloff. These processed radial traces are then fit to a model of light falloff. In one preferred embodiment, the model of light falloff is based upon the $\cos^4$ thin lens falloff model described by many texts on the subject of optics. For example, the $\cos^4$ behavior of falloff is described by Klein in *Optics*, John Wiley & Sons, Inc., New York, 1986.

The operation of this model is fully described in U.S. patent application Ser. No. 09/293,197, incorporated herein by reference. The operation of the falloff estimator 20 is to determine the value of the optimal falloff value $f_c$ which best describes the light falloff present in the images input to the falloff estimator 20. The output of the falloff estimator 20 is the optimal falloff value $f_c$.

The optimal falloff value $f_c$ is then input to a falloff mask generator 30. The falloff mask generator 30 generates a light falloff compensation mask in order to compensate for the apparent light falloff present in the class of images input to the falloff estimator 20. Note that the images $G_i(x,y)$ undergo the falloff compensation by using the optimal falloff value $f_c$ as will be described in more detail herein below. The images which will undergo compensation $G_i(x,y)$ correspond to the images which are input to the falloff estimator 20. Since only a small resolution image is required for the falloff estimator 30 to perform effectively, generally each image $F_i(x,y)$ input to the falloff estimator 20 is a low resolution version of the corresponding high resolution image $G_i(x,y)$ upon which the falloff compensation mask is applied. For example, in the preferred embodiment, the images $F_i(x,y)$ have a resolution of 128 pixels by 192 pixels, and the images $G_i(x,y)$ have a resolution of 1024 pixels by 1536 pixels. The image $F_i(x,y)$ is generated by performing a sampling operation on the full resolution image $G_i(x,y)$. However, since the falloff estimator 20 performs effectively for any resolution of input images, it is a possibility that $F_i(x,y)=G_i(x,y)$. By utilizing a lower resolution, and the invention dramatically increases processing speed and lowers required hardware overhead.

The falloff mask generator 30 constructs a light falloff compensation mask for the purpose of compensating each high resolution image $G_i(x,y)$ for the falloff indicated by the parameter value of $f_c$ determined by the falloff estimator 20. In one preferred embodiment, the falloff mask generator 30 constructs a light falloff compensation mask lfcm(x,y) according to the following equation:

$$lfcm(x, y) = -\frac{4cvs}{\log 2}\log\left(\cos\left(\tan^{-1}\left(\frac{d}{f}\right)\right)\right)$$

where d is the distance from the (x,y) pixel position to the center of the image and cvs is the number of code values per stop of exposure (again assuming that the image metric is logarithmic with respect to exposure.) In one preferred embodiment, the value of cvs is 300. Typically, the value of f is the focal length of the thin lens. U.S. patent application Ser. No. 09/293,197 explains several methods for determining the value of f. For instance, the value off may be selected based on camera type, or selected so that lfcm(x,y) provides a similar light falloff compensation to an optical printer. The relationship between the focal length f (expressed in pixels) and the value of $f_c$ may be given as:

$$f = \frac{1}{d_{max}}\tan\left(\cos^{-1}\left(10^{-\frac{1}{4}f_c \log 2}\right)\right)$$

where $d_{max}$ is the distance from the (0,0) (or any image corner) position to the center of the image in pixels. Assuming that the center of the image is coincident with the center of the array of pixels, the distances d and $d_{max}$ are given as:

$$d = \sqrt{\left(x-\frac{r}{2}\right)^2 + \left(y-\frac{c}{2}\right)^2}$$

$$d_{max} = \sqrt{\left(\frac{r}{2}\right)^2 + \left(\frac{c}{2}\right)^2}$$

where r is the number of rows and c is the number of pixels of the full resolution image $G_i(x,y)$ to which the falloff will be applied. Therefore, the invention produces the falloff estimation without having to know the focal length of the camera used to obtained the image. Instead, the invention can calculate the focal length based upon the optimal falloff value $f_c$. This dramatically simplifies the process of performing light falloff correction because the only data that is required is the image itself and no external environmental data regarding the camera needs to be maintained.

Those skilled in the art will recognize that various other models of falloff and light falloff compensation masks may be utilized with nearly equal success. For example, it would be relatively simple to construct a falloff model and a light falloff compensation mask with 2-dimensional polynomial functions. However, such deviations from the preferred embodiment should not be considered as novel.

As previously mentioned, the output of the falloff mask generator is a light falloff compensation mask lfcm(x,y). Because the image data is assumed to be logarithmic with respect to the scene exposures, the light falloff compensation mask is then additively applied to each of the full resolution images $G_i(x,y)$, as shown in FIG. 1 to form light falloff compensated images $H_i(x,y)$. Alternatively, the metric of the image data may be linear with respect to the scene exposure, in which case the falloff compensation mask would be multiplicatively applied to each of the full resolution images $G_i(x,y)$.

Referring to FIG. 1, the aforementioned underexposure checker 10 classifies images as "underexposed" or "non-underexposed." Underexposed images often have significant portion of digital values at or near the minimum possible density. Thus, the falloff of a lens has no effect of the values of such pixels. Applying falloff compensation to such an image will cause the image corners to become unnaturally lighter than neighboring regions of the image.

The underexposure checker 10 first calculates the cumulative histogram of the input image. The underexposure checker 10 then calculates two features:

$$f_1 = \frac{c_{50} - c_1}{c_{99} - c_1}$$

$$f_2 = C_{50} - D_{min}$$

where $C_n$ indicates the code value which n percent of the pixels values are equal to or less than, and $D_{min}$ indicates the minimum possible code value of the signal. In one preferred embodiment, $D_{min}$ is typically about 959. Only if $f_1 < t_1$ or if $f_2 < t_2$, then the image is classified as "underexposed" and is not input to the falloff estimator 20. In one preferred embodiment, $t_1 = 0.2$ and $t_2 = 300$. Those skilled in the art will recognize that the detection of underexposed scenes may be accomplished in a multitude a ways and a deviation from this preferred embodiment in the underexposure checker 10 should not be considered novel with respect to the present invention.

Figure 2:
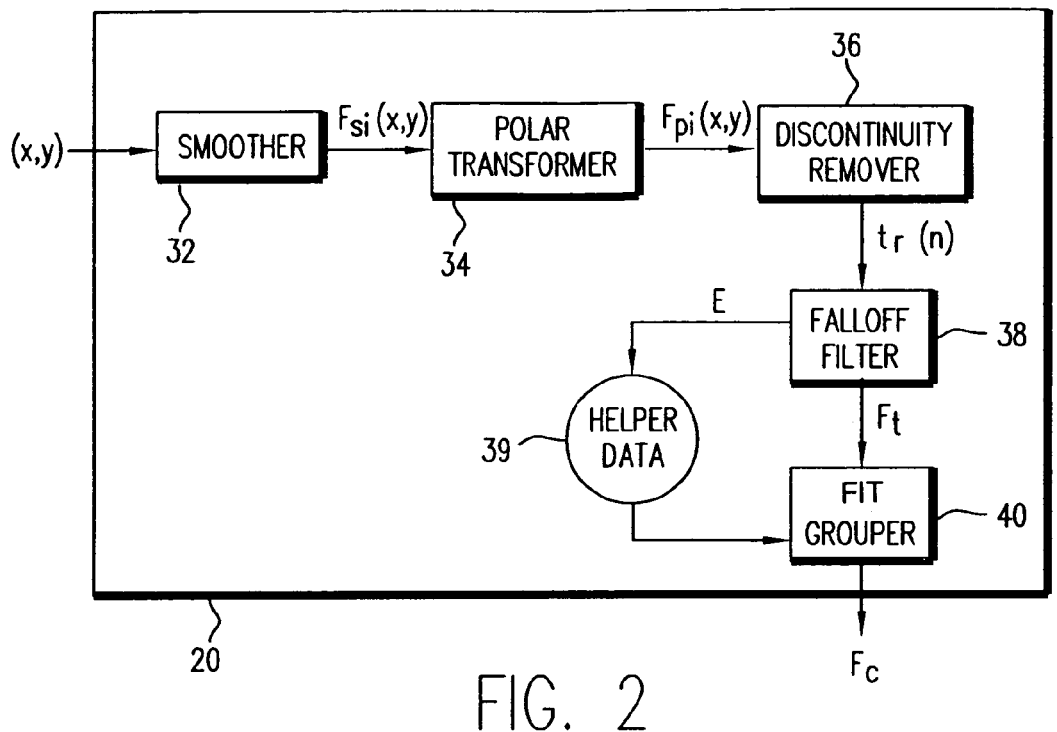
FIG. 2 is an exploded block diagram of the falloff estimator from FIG. 1.

Referring to FIG. 2, therein is shown an exploded view of the falloff estimator 20. Note that the falloff estimator 20 is typically operated on only a single channel of each digital image. Each digital image consists of one or more digital image channels. A digital image consisting of red, green and blue pixel values is said to consist of three digital image channels. In one preferred embodiment, the falloff estimator 20 operates on only the green channel of a digital image. However, those skilled in the art will recognize that other digital image channels, including digital image channels which are formed by combining the original digital image channels can be input to the falloff estimator 20 for estimating a level of falloff for the class of images input to the falloff estimator 20. Note that as an alternative to using the green digital image channel to determine a level of falloff, it is also possible to apply the falloff estimator 20 to one or more distinct digital image channels and then choose a level of falloff by examining the results of the falloff estimates determined by the falloff estimator 20 for each distinct digital image channels.

The purpose of the falloff estimator 20 is to determine the value of the parameter $f_c$ for the class $F_t(x,y)$ input to the falloff estimator 20. To this end, each image $F_t(x,y)$ input to the falloff estimator 20 undergoes a processing in order to extract radial traces from the image. The variation of these processed radial traces is presumably attributed to light falloff.

As shown in FIG. 2, the analysis image $F_t(x,y)$ is first input to a smoother 32. The purpose of the smoother 32 is to perform an edge-preserving smoothing of the analysis image. The output of the smoother 32 is an image whose modulation is slowly varying, except for the discontinuities of large edges, which have been preserved. In one preferred embodiment, the 4-pass adaptive recursive filter described in U.S. Pat. No. 6,728,416, issued on Apr. 27, 2004, is applied to the analysis image. Alternatively, those skilled in the art recognize many methods of edge-preserving smoothing are available. For example, the sigma filter, described by Jong-Sen Lee ("Digital Image Enhancement and Noise Filtering by Use of Local Statistics", IEEE Transactions on Pattern Recognition and Machine Intelligence, Vol. PAMI-2, No. 2, March 1980, incorporated herein by reference) may be achieve an adequate edge preserving smoothing.

The smoothed digital image $F_{si}(x,y)$ output from the smoother 32 is then passed to a polar transformer 34 for converting the smoothed digital image from a rectangular coordinate system to a polar coordinate system. Such transformations are well known in the art. In one preferred embodiment, the polar representation of the smoothed digital image has an equal number of rows and columns to the original smoothed digital image. Both the smoothed digital image $F_{si}(x,y)$ and the polar digital image $F_{pi}(x_p,y_p)$ contain c columns and r rows. In one preferred embodiment, each row of the polar space represents a certain radial distance from the center of the smoothed image, and each column represents an angle (with the first column representing 0 degrees.) Each column represents an angular increment of $2\pi/c$, and each row represents an radial increment of $$\frac{\sqrt{r^2+c^2}}{2r}.$$

Each ($x_p$, $y_p$) location in polar space has a corresponding (x,y) location in rectangular space. This correspondence is described by the following two equations:

$$x = \frac{c-1}{2} + \frac{y_p\sqrt{r^2+c^2}}{2r}\cos\left(\frac{2\pi x_p}{c}\right)$$

$$y = \frac{r-1}{2} + \frac{y_p\sqrt{r^2+c^2}}{2r}\sin\left(\frac{2\pi x_p}{c}\right)$$

Thus, the polar transformer 34 determines the value of the polar digital image $F_{pi}(x_p,y_p)$ at a location ($x_{po}$, $y_{po}$) by first determining the corresponding location ($x_o,y_o$) in rectangular space. Then the values of the smoothed digital image $F_{si}(x,y)$ nearby the location ($x_o,y_o$) are interpolated in order to determine the value of $F_{pi}(x_{po}, y_{po})$. Such interpolation is well known in the art and will not be further discussed. Note that the location in rectangular coordinates (x,y) corresponding to the location in the polar coordinates ($x_p,y_p$) will sometimes fall outside of the bounds of the image. In this case, the value of $F_{pi}(x_p, y_p)$ is set to a constant, for instance 0.

The polar digital image $F_{pi}(x_p,y_p)$ has the following characteristics. The top ($0^{th}$) row of the polar digital image consists of a constant code value equal to the pixel value of the central pixel of the smoothed digital image, which is in rectangular coordinates. Each column of the polar digital image corresponds to a radial trace from the center of the image out to the image edge. Thus, the polar image essentially consists of c radial traces t(n) where n ranges from 0 to r−1 of the smoothed digital image from the center out to the image edge. The length l of the radial trace (for example, column $y_p$) is the smallest value of $x_p$ for which the corresponding location (x,y) in rectangular coordinates falls outside of the boundary of the smoothed digital image. Thus, radial traces corresponding to angles from the image center to a corner of the smoothed digital image have the longest length l.

Next, the radial traces are input to the discontinuity remover 36. The purpose of the discontinuity remover 36 is to remove large image edges caused by highly different object reflectances or illumination. A discontinuity is considered to be any pixel to pixel variation along a radial trace that is too great to be caused by light falloff alone. Note that this definition of discontinuity will be dependent upon the position along the radial trace. Also, the number of discontinuities is recorded for determination of a smoothness value P. The value of P is equal to the length of the radial trace l minus the number of discontinuities in the radial trace.

Figure 3:
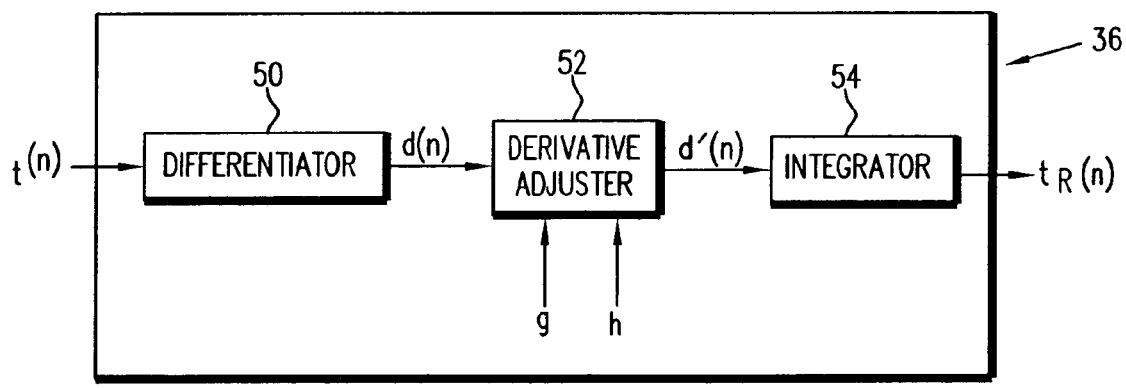
FIG. 3 is an exploded block diagram of the discontinuity remover from FIG. 2.

A radial trace is represented by t(n) where the value of t(0) is the same as the value of the pixel in the center of the smoothed digital image. FIG. 3 shows an exploded block diagram of the discontinuity remover 36. Each radial trace t(n) is first passed to a differentiator 50 for the purpose of determining an estimate d(n) of the derivative of the radial trace.

The differentiator 50 determines the estimate of d(n) by the following equation:

$$d(n)=t(n)-t(n-1)$$

where t is the original radial trace, d is the derivative estimate of the original radial trace, and n ranges from 0 to r−1.

Each estimate d(n) of the derivative of the radial trace is then passed to the derivative adjuster 52. The derivative adjuster 52 compares d(n) with upper and lower ($d_{max}$(n) and $d_{min}$(n), respectively) derivative bounds. Any value of the estimate d(n) falling outside of these bounds is adjusted. The output of the derivative adjuster 52 is the adjusted derivative estimate d'(n).

The falloff bounds $u_{max}$(n) and $u_{min}$(n) are calculated with the following equations:

$$u_{max}(n) = \frac{4}{\log 2} cvs\log\left[\cos\left[\frac{n}{r-1}\cos^{-1}\left(10^{-(\frac{1}{4}g\log 2)}\right)\right]\right]$$

$$u_{min}(n) = \frac{4}{\log 2} cvs\log\left[\cos\left[\frac{n}{r-1}\cos^{-1}\left(10^{-(\frac{1}{4}h\log 2)}\right)\right]\right]$$

where cvs is the number of code values per stop of exposure (in one preferred embodiment this value is 300) and g is the upper limit of light falloff and h is the lower limit of light falloff. The values of g and h (given as the maximum and minimum expected levels of light falloff in stops of falloff from the center of the image to a corner of the image) may vary depending on the source of the digital images. For example the values of g and h may be different for images originating from a 35 mm camera or from an APS camera. In one preferred embodiment, The value of g is preferably 0.35 for images originating from a 35 mm camera and 0.6 otherwise. The value of h is preferably 4.0. The derivative bounds $d_{max}(n)$ and $d_{min}(n)$ are calculated with the following equations:

$$d_{max}(n)=U_{min}(n)-u_{min}(n-1)$$

$$d_{max}(n)=U_{max}(n)-U_{max}(n-1)$$

Next, the derivative adjuster 52 examines the derivative d(n) for discontinuities. A discontinuous point occurs when either of the following two conditions is met:

$$d(n_o)>d_{min}(n_o)$$

$$d(n_o)<d_{max}(n_o)$$

In one preferred embodiment, when a discontinuous point at $n_o$ is encountered, the value of the adjusted derivative estimate $d'(n_o)$ is set equal to a weighted sum of the previous three values, by the equation:

$$d'(n_o)=0.4d'(n_o-1)+0.3d'(n_o-2)+0.3d'(n_o-3)$$

If no discontinuity occurs at $n_o$, then the value of $d'(n_o)$ is determined by the equation:

$$d'(n_o)=d(n_o)$$

The adjusted derivative estimate $d'(n_o)$ is then passed to the integrator 54 in order to reconstruct a radial trace. The output of the integrator 54 is an adjusted radial trace $t_R(n)$. The integrator 54 performs the following operation in order to determine the adjusted derivative estimate:

$$t_R(n)=d'(n)+t_R(n-1)$$

where n ranges from 1 to r, $t_R$ is the U.S. Pat. No. adjusted radial trace which has no discontinuities, and $t_R(0)=t(0)$. Note that the adjusted radial trace should be monotonically decreasing.

Each adjusted radial trace $t_R(n)$ is input to a falloff fitter 38. The purpose of the falloff fitter 38 is to fit a predetermined model of falloff to the adjusted radial trace. In one preferred embodiment, the predetermined model of falloff is a model consisting of a single parameter over which the fitting occurs. However, those skilled in the art will recognize that any appropriate model may be used. In one preferred embodiment, the falloff model is represented by the function w(n):

$$w(n) = \frac{4}{\log 2} cvs \log \left[ \cos \left[ \frac{n}{r-1} \cos^{-1}\left(10^{-(\frac{1}{4}f_t \log 2)}\right) \right] \right] + C_l$$

where cvs is the number of code values per stop of exposure (in one preferred embodiment this is 300), $f_t$ is the parameter over which the fit will occur to describe the falloff of the adjusted radial trace, and $C_1$ is an offset term. The units of the variable $f_t$ is in stops of falloff between the corner of the digital image and the center of the digital image.

Any technique commonly used to fit a model to data may be used to determine the optimal value of $f_t^*$ by fitting the model w(n) to the adjusted radial trace $t_R(n)$. In the preferred embodiment, the chosen $f_t$ provides for the optimal fit by minimizing the squared difference between w(n) and $t_R(n)$. Such techniques of fitting are commonly known in the art and will not be further discussed.

The fit $f_t^*$ for each radial trace is then input to the fit grouper 40 in order to combine the multiple estimates of a level of falloff and determine an overall estimate for the level of falloff over the entire classic of digital images input to the falloff estimator 20.

In an additional embodiment, data 39 corresponding to each fit $f_t^*$ can be input to the fit grouper 40. This data will herein be referred to as "helper data 39" and helps weight the different fits $f_t$ of the different radial traces. For example, the Mean Squared Error (MSE), denoted herein as E, between w(n) (evaluated with $f_t=f_t^*$) and $t_R(n)$) can be input to the fit grouper 40. Additionally, the length l of the radial trace corresponding to each fit $f_t^*$ can be input to the fit grouper 40. Also, the aforementioned smoothness value P can also be input to the fit grouper 40.

In one preferred embodiment, the fit grouper 40 places more weight on those fits $f_t^*$ whose corresponding helper data indicates that more importance is warranted. For example, in the preferred embodiment, only those fits $f_t^*$ whose length l is among the top X % of lengths are considered. In one preferred embodiment, X=70. (Those skilled in the art will recognize that processing time may be saved by not processing the shortest (100–X)% of the radial traces.)

In the preferred embodiment, the class fit $f_c$ is determined by calculating a weighted average of all fits $f_t^*$ corresponding to the radial traces whose length l is among the longest X % of radial traces. The calculation of a weighted average is well known in the art. A weight W used in the weighted averaging process is placed upon each of the fits $f_t^*$.

For example, the weight W can be determined by the following equation:

$$W=\alpha Q+\beta S$$

Where Q relates to the radial trace quality and is given as $Q=\log(P+1)$, and S relates to the quality of fit and is given as:

$$S = 1 - \tanh\sqrt{\frac{E}{4l}}.$$

The constants $\alpha$ and $\beta$ can be determined empirically (e.g., 0.084 and 1.535, respectively in this example).

As an alternative embodiment, the class fit $f_c$ may be determined by averaging all of the fits $f_t^*$ corresponding to the radial traces whose length l is among the longest X % of radial traces.

As a further alternative embodiment, the class fit $f_c$ may be determined by averaging all fits $f_t^*$.

Thus, the invention performs light falloff correction without requiring external environmental inputs. In other words, the invention performs falloff correction based solely upon the image (or series of images). Further, the invention eliminates discontinuities from the falloff calculation, which greatly enhances the accuracy of the falloff correction.

Figure 4:
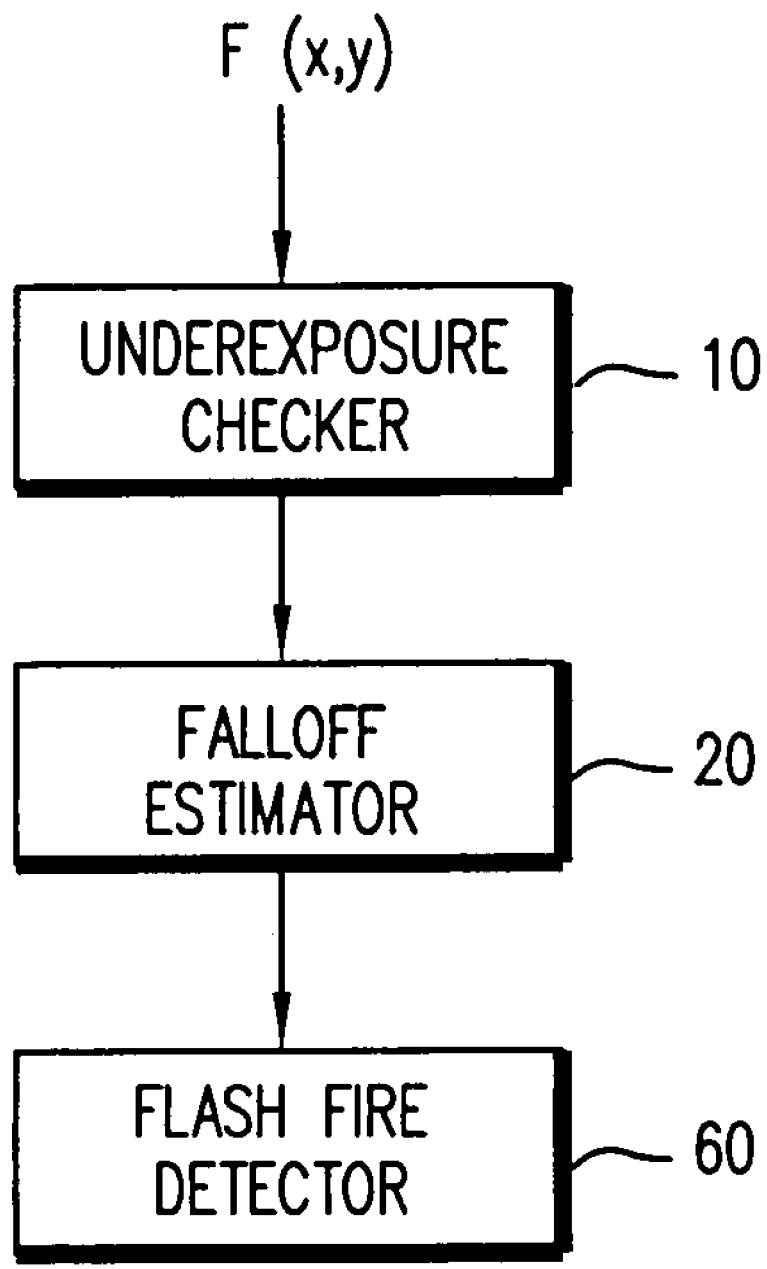
FIG. 4 is a block diagram of another embodiment of the invention.

In a further embodiment of the present invention, the flash condition of an image may be determined by the output of the falloff estimator 20. FIG. 4 illustrates a single image F(x,y) which is passed to the underexposure checker 10. Assuming that the image F(x,y) is not considered underexposed by the underexposure checker 10, the image F(x,y) is passed to the falloff estimator 20, whose function and operation has herein above been described. The output of the falloff estimator 20 is the class fit $f_c$. In the case of FIG. 4, the class consists of a single image F(x,y).

Figure 5:
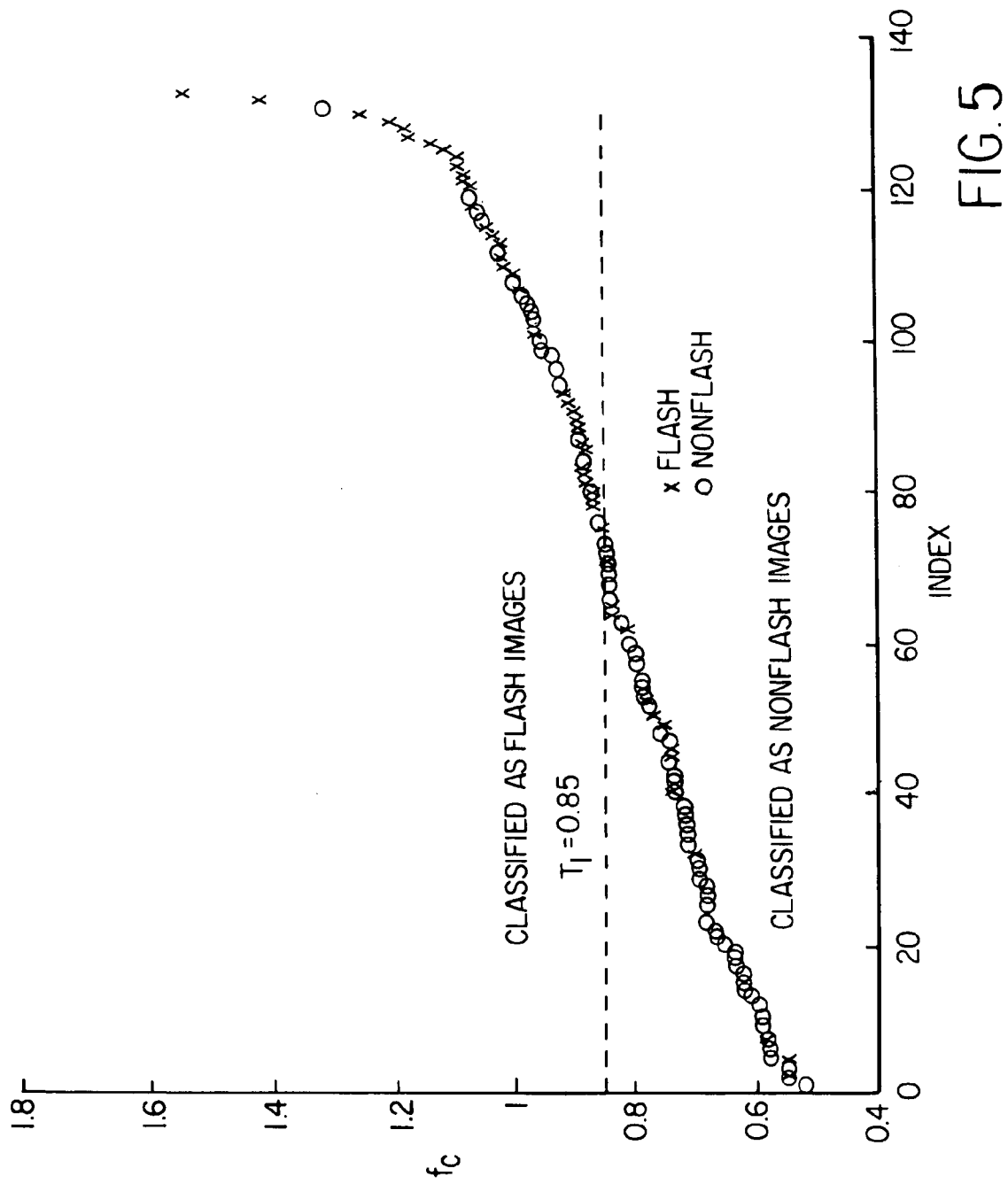
FIG. 5 is a chart showing the classification of flash vs. non-flash images.

The value of the class fit $f_c$ may be used to determine the flash condition of an image by the flash fire detector 60. The purpose of the flash fire detector 60 is to determine whether the camera's flash was fired during the photographing process of the image F(x,y). The flash fire detector 60 utilizes the class falloff fit $f_c$ (e.g., the amount of light falloff) to determine whether the image was obtained during the presence of a flash. In general, images captured with flash exhibit a greater degree of falloff (and therefore a higher value of $f_c$.) FIG. 5 illustrates this fact by showing the value of $f_c$ for 133 images.

In the graph shown in FIG. 5, those images which were captured with the flash are represented with the symbol 'x' and those images which were captured without the flash are represented with the symbol 'o'. If the value of $f_c$ is greater than $T_1$, then the flash fire detector 60 determines that the camera flash was fired when the photograph F(x,y) was captured. Alternatively, if the value of $f_c$ is less than $T_1$, then the flash fire detector 60 determines that the camera flash was not fired when the photograph F(x,y) was taken. Note that although the flash fire detector 60 is illustrated with a single input from the falloff estimator 20, with the invention, the flash fire detector 60 may receive other information either directly from the camera or information derived from the digital image as an aid to detect the flash fire condition of the image F(x,y). In one exemplary embodiment, the value of $T_1$ is 0.85. As a testament to the effectiveness of the inventive flash fire detector 60, when the value of $T_1$ is 0.85, the flash condition of 93 out of 133 (70%) images was correctly identified. Out of these 133 images, 62 (47%) were flash images and 71 (53%) were not flash images. Thus, the flash fire detector 60 effectively determines the flash condition of an image.

As shown above, the invention provides the ability to perform light falloff correction without requiring external environmental inputs. In other words, the invention performs falloff correction based solely upon the image (or series of images). Further, the invention provides a unique feature for eliminating discontinuities from the falloff calculation. By eliminating discontinuities, the accuracy of the falloff correction is greatly enhanced.

The invention has been described in detail with particular reference to certain preferred embodiments thereof, but it will be understood that variations and modifications can be effected within the spirit and scope of the invention.

PARTS LIST

Item Description
10 underexposure checker
20 falloff estimator
30 falloff mask generator
32 smoother
34 polar transformer
36 discontinuity remover
38 falloff fitter
39 Helper Data
40 fit grouper
50 differentiator
52 derivative adjuster
54 integrator
60 flash fire detector

What is claimed is:

1. A light falloff determining system comprising:
   a polar transformer that converts an image into radial traces;
   a falloff fitter that fits said radial traces to a model of falloff to determine a light falloff correction for said image; and
   a discontinuity remover that removes discontinuities from said radial traces, thereby producing continuous radial traces, wherein said falloff fitter fits said continuous radial traces to said model of falloff to determine said light falloff correction for said image;
   a differentiator that determines an estimate of derivatives of said radial traces;
   a derivative adjuster that adjusts said estimate of derivatives and produces adjusted derivatives that are within minimum and maximum derivative bounds; and
   an integrator that produces said continuous radial traces from said adjusted derivatives.

2. The system in claim 1, further comprising an underexposure checker that prevents underexposed images from being processed by said polar transformer.

3. The system in claim 1, further comprising a falloff mask generator that generates a correction mask for said image based on said light falloff correction.

4. The system in claim 1, further comprising a grouper that combines fit values used by said falloff fitter to fit said radial traces to said model.

5. The system in claim 4, further comprising a weighting unit that weights said fit values.

6. The system in claim 1, further comprising a flash fire detector that determines whether said image was obtained with a flash depending upon said light falloff amount.

7. The system in claim 1, wherein said polar transformer produces said radial traces from a group of images and said falloff fitter determines a single light falloff amount for said group of images.

8. An image processing system comprising:
   an image collector;
   a light falloff correction system comprising a polar transformer that converts an image into radial traces; and a falloff fitter that fits said radial traces to a model of falloff to determine a light falloff correction for said image; and
   a discontinuity remover that removes discontinuities from said radial traces, thereby producing continous radial traces, wherein said falloff fitter fits said continuous radial traces to said model of falloff to determine said light falloff correction for said image;
   a differentiator that determines an estimate of derivatives of said radial traces;
   a derivative adjuster that adjusts said estimate of derivatives and produces adjusted derivatives that are within minimum and maximum derivative bounds; and
   an integrator that produces said continuous radial traces from said adjusted derivatives.

9. The system in claim 8, further comprising an underexposure checker that prevents underexposed images from being processed by said polar transformer.

10. The system in claim 8, further comprising a falloff mask generator that generates a correction mask for said image based on said light falloff correction.

11. The system in claim 8, further comprising a grouper that combines fit values used by said falloff fitter to fit said radial traces to said model.

12. The system in claim 11, further comprising a weighting unit that weights said fit values.

13. The system in claim 8, further comprising a flash fire detector that determines whether said image was obtained with a flash depending upon said light falloff correction.

14. The system in claim 8, wherein said polar transformer produces said radial traces from a group of images and said falloff fitter determines a single light falloff correction for said group of images.

15. A method of performing light falloff correction of an image, said method comprising:
   converting an image into radial traces;
   fitting said radial traces to a model of falloff to determine said light falloff correction for said image; and
   removing discontinuities from said radial traces, thereby producing continuous radial traces, wherein said fitting comprises fitting said continous radial traces to said model of falloff to determine said light falloff correction for said image;
   estimating derivatives of said radial traces;
   adjusting said derivatives to produce adjusted derivatives that are within minimum and maximum derivative bounds; and
   integrating said adjusted derivatives to produce said continous radial traces.

16. The method in claim 15, further comprising preventing underexposed images from being converted.

17. The method in claim 15, further comprising generating a correction mask for said image based on said light falloff correction.

18. The method in claim 15, further comprising combining fit values to fit said radial traces to said model.

19. The method in claim 18, further comprising weighting said fit values.

20. The method as is claim 15, further comprising applying said light falloff correction to said image.

21. The method as in claim 15, further comprising detecting a flash fire condition of said image based on an amount of said light falloff correction.

22. The method in claim 15, wherein said converting is performed on a group of images and said determining produces a single light falloff correction for said group of images.

23. A method of estimating an amount of light falloff in a digital image comprising:
   providing a digital image;
   providing at least one model of light falloff;
   fitting said model of light falloff to said digital image to determine said amount of light falloff in said digital image;
   converting said digital image into radial traces;
   fitting said radial traces to said model of light falloff to determine said amount of light falloff in said digital image;
   removing discontinuities from said radial traces, thereby producing continuous radial traces, wherein said fitting comprises fitting said continous radial traces to said model of light falloff to determine said amount of light falloff in said digital image;
   estimating derivatives of said radial traces;
   adjusting said derivatives to produce adjusted derivatives that are within minimum and maximum derivative bounds; and
   integrating said adjusted derivatives to produce said continuous radial traces.

24. The method in claim 23, further comprising, before said fitting of said model, processing said digital image using a sigma filter.

25. The method in claim 23, further comprising preventing underexposed images from being fitted.

26. The method in claim 23, further comprising generating a correction mask for said digital image based on said amount of light falloff.

27. The method as in claim 23, further comprising detecting a flash fire condition of said image based on said amount of light falloff in said digital image.

28. The method in claim 23, wherein said fitting is performed on a group of images and said fitting produces a single amount of light falloff for said group of images.

\* \* \* \* \*